United States Patent [19]

Takaoka et al.

[11] 4,417,331
[45] Nov. 22, 1983

[54] METHOD FOR MANUFACTURING AN OPTICAL DISC

[75] Inventors: Takashi Takaoka; Masahiko Mochizuki; Mitsuo Yamashita; Tadao Miura, all of Yokohama, Japan

[73] Assignee: Tokyo Shibaura Denki Kabushiki Kaisha, Kawasaki, Japan

[21] Appl. No.: 235,427

[22] Filed: Feb. 17, 1981

[30] Foreign Application Priority Data

Feb. 18, 1980 [JP] Japan .................................. 55-18698

[51] Int. Cl.³ .............................................. G11B 7/00
[52] U.S. Cl. ................................... 369/111; 369/279; 369/284; 369/44; 369/13
[58] Field of Search ............... 369/111, 109, 275, 276, 369/277, 279, 284, 44, 132, 93, 13, 16; 346/135.1, 137, 76 L, ; 358/128.5, 342; 204/5; 264/106

[56] References Cited

U.S. PATENT DOCUMENTS

| | | | |
|---|---|---|---|
| 3,373,997 | 3/1968 | Berndt | 369/279 |
| 3,430,966 | 3/1969 | Gregg | 369/111 |
| 3,842,194 | 10/1974 | Clemens | 369/132 |
| 4,005,259 | 1/1977 | Kaneko | 369/122 |
| 4,209,793 | 6/1980 | Ueno | 369/112 |
| 4,209,804 | 6/1980 | DIL | 358/128.5 |
| 4,295,162 | 10/1981 | Carlsen | 369/275 |
| 4,310,919 | 1/1982 | Slaten | 369/275 |

FOREIGN PATENT DOCUMENTS

| | | | |
|---|---|---|---|
| 55-449 | 4/1980 | Japan | 358/128.5 |
| 2035661 | 6/1980 | United Kingdom | 369/13 |

OTHER PUBLICATIONS

K. Bulthuis et al., Ten Billion Bits on a Disk, IEEE Spectrum, Aug., 1979, pp. 26–33.

*Primary Examiner*—Alan Faber
*Attorney, Agent, or Firm*—Cushman, Darby & Cushman

[57] ABSTRACT

In an optical disk having an optical recording layer which is capable of having information thereon using a laser beam with information superposed by modulation there is formed a spiral protruding or recessed track having a width equal to about half or less of the wavelength of a laser beam to be used, this track being utilized as the guiding track of the laser beam. A method for manufacturing such an optical disk is also disclosed according to which a recessed track for tracking is formed by plastic deformation of the upper surface of an original disk with a hard processing stylus such as a diamond stylus. The original disk thus produced is utilized for forming an optical recording disk having a protruding or recessed guiding track.

2 Claims, 21 Drawing Figures

METHOD FOR MANUFACTURING AN OPTICAL DISC

BACKGROUND OF THE INVENTION

The present invention relates to an optical disk for optically writing and reading information and to a method for manufacturing the same.

An optical disk is known in which information is written by a laser beam modulated by the information, and the information is thereafter photoelectrically read by a laser beam.

In this type of optical disk, an optical recording layer of metal or photosensitive dye is covered on a substrate of glass or plastic whose surface is finished as an optical plane. As shown in FIG. 1, information is written on this optical disk 1 by rotating it in the direction shown by the arrow while irradiating an information-modulated laser beam L on the surface of the optical disk 1 with a lens 2 and moving a reading/writing head 3 in the direction of the arrow. This device incorporates a high precision tracking control mechanism for indirectly forming tracks to define the rotation of the optical disk 1 and the travelling path of the reading/writing head 3, since optical disk 1 does not have any guiding tracks. However, such a control mechanism tends to be mechanically complex and costly.

In order to more easily perform tracking for writing, an optical disk 4 has been proposed according to which, as shown in FIG. 2, a guiding groove 6 having a width of 0.6 $\mu$m and a depth of $\frac{1}{8}$ of the wavelength ($\lambda$) of the laser beam L is formed on a substrate 5 at a track pitch of 1.67 $\mu$m, and an optical recording layer 7 is coated on the surface of this substrate. Such an optical disk is known, for example, from K. Bulthuis, et al, "Ten billion bits on a disk," IEEE, spectrum, Aug. p. 26, 1979. When this grooved optical disk 4 and the planar optical disk 1 described above are compared, the laser beam L which is focussed by the lens 2 and irradiated as a spot of diameter "d" on the optical disk 1 is reflected by the surface of the optical disk 1 and return to the lens 2, as shown in FIG. 3. The power intensity "I" at the surface of the lens 2 of this reflected light generally has single-peaked power intensity distribution of I($\gamma$). This reflected light catches I($\gamma$)NA as defined by the effective aperture NA of the lens 2 and is guided to a photodetector. With the planar optical disk 1, since I($\gamma$) is constant at any position of its surface, information cannot be recorded on the optical disk 1 at a desired track pitch unless the rotation of the optical disk 1 and the feeding of the lens 2 in the radial direction of the disk are correctly programmed in advance for indirect control.

On the contrary, with the grooved optical disk 4 shown in FIG. 2, the phase of the light reflected to the center of the surface of the lens 2 from the bottom surface of the guiding groove 6 having a depth of $\frac{1}{8}$ of the wavelength of the laser beam lags that of the light reflected from the periphery of the guiding groove 6 by $\frac{1}{4}$ wavelength. Thus, the reflected light rays caught at the center of the lens interfere with each other so that the power intensity is reduced. The total reflected light is diverged by the diffraction by the guiding groove 6 and is widely distributed over the surface of the lens 2. Thus, the power intensity distribution of the reflected light on the surface of the lens 2 becomes that as shown in FIG. 4. When the center of the irradiating spot of the laser beam L is aligned with the center of the guiding groove 6, the distribution becomes a symmetrical reflected light distribution of I'($\gamma$) wherein the power intensity at the center of the lens 2 is low. When the center of the spot is deviated from the guiding groove 6, the distribution becomes the distribution I($\gamma$) with maximum central power intensity. Thus, when variations in the power intensity and the distribution of the reflected light incident in NA of the lens 2 are converted into electrical signals by the photodetector disposed behind the lens 2, tracking may be easily performed so that the spot center of the laser beam L from the reading/writing head 3 is constantly aligned with the center of the guiding groove 6.

This guiding groove 6 is conventionally formed by photoetching methods utilizing a laser beam. However, as has already been described, it is very difficult to form, uniformly and with precision, guiding grooves of fine width and depth. This factor has significantly increased the cost of optical disks.

SUMMARY OF THE INVENTION

The present invention overcomes these problems of the prior art and, as its object, provides an optical disk according to which tracking control is easy, the manufacture is also easy, and the manufacturing cost may be lowered. Another object of the present invention is to provide an optical disk having a guiding track such that the width of the guiding track is extremely small and the guiding track does not interfere with the high density of the recorded information, and a manufacturing method for the same.

The present invention thus provides an optical disk having an optical recording layer which is capable of having information written thereon by irradiating a focussed laser beam modulated by the information and also capable of reading the information characterized in that a protruding or recessed spiral track is formed on a substrate in relief with a desired pitch and a width of less than half the wavelength of the laser beam as a guiding track, an optical recording layer being coated on the substrate.

The present invention further provides an optical disk characterized in that two substrates with said guiding tracks are superposed on each other with a spacer interposed therebetween and with their optical recording layers facing each other.

The present invention further provides a method for manufacturing an optical disk having an optical recording layer which is capable of having information written thereon by irradiating a focussed laser beam modulated by the information and also capable of reading the information, characterized by forming a spiral recessed track at a desired pitch on an original disk with a processing stylus having a pointed end, coating a metal layer on the original disk, peeling the metal layer to provide a recess in relief mold, forming a substrate having a recessed track using this mold as the original, and coating an optical recording layer on the surface of the substrate.

The present invention further provides a method for manufacturing an optical disk having an optical recording layer which is capable of writing information by irradiating a focussed laser beam modulated by the information and also capable of reading the information, characterized by forming a spiral recessed track at a desired pitch on an original disk with a processing stylus having a pointed end, coating a metal layer on the original disk, forming a second original disk with a protruding track by peeling the metal layer, forming a recessed relief mold by coating a metal layer on the second original disk and peeling it off, casting a synthetic resin layer on this mold, forming a substrate having a protruding track by inverting the recessed track by peeling the synthetic resin layer, and coating an optical recording layer on the surface of the substrate.

DETAILED DESCRIPTION OF THE INVENTION

Figure 1:
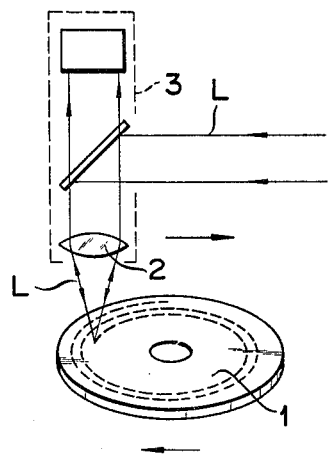
FIG. 1 is a schematic view illustrating the construction of a conventional planar optical disk and its writing and reading system.
Figure 2:
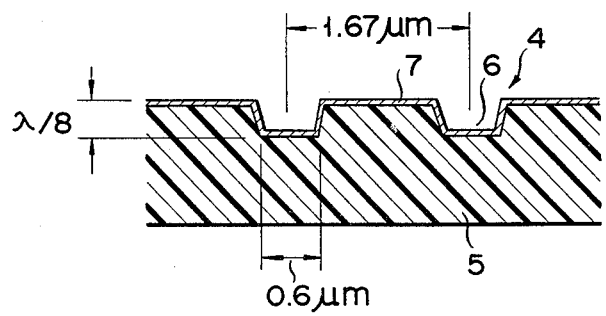
FIG. 2 is an enlarged sectional view of a conventional optical disk with a tracking groove.
Figure 3:
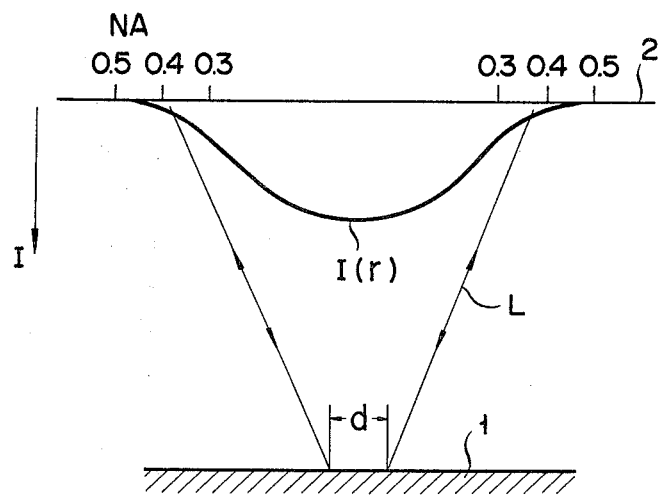
FIG. 3 is a view illustrating the reflecting condition of a laser beam in the conventional optical disk.
Figure 4:
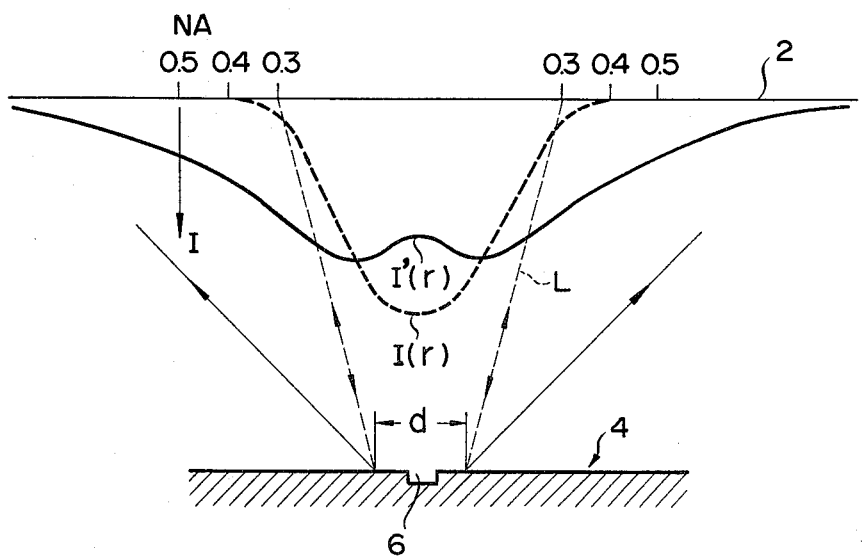
FIG. 4 is a view illustrating the reflecting condition of a laser beam in the conventional optical disk with a tracking groove.
Figure 5:
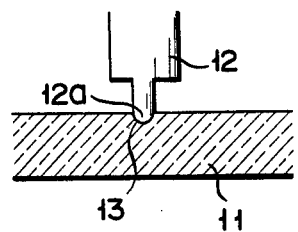
FIGS. 5 and 6(A) are a sectional view and a perspective view for explaining the method according to the present invention.
Figure 6A:
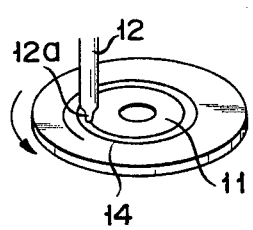
Figure 6B:
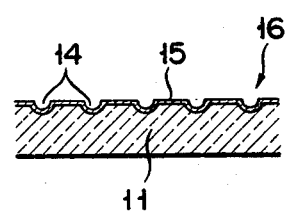
FIG. 6(B) is a sectional view of an optical disk of the present invention.

The present invention will now be described with reference to its examples shown in the attached drawings. FIGS. 5 and 6 (A and B) show the first embodiment of the device which uses a diode laser beam of about 0.82 $\mu$m wavelength. Reference numeral 11 denotes a disk-shaped substrate made of glass. When a processing stylus 12 of a hard material such as diamond whose end 12a is semispherical and 0.3 $\mu$m in diameter is pressed with a load of about 0.1 g on the surface of the substrate 11 as shown in FIG. 5, recesses 13 of a depth of about 0.2 $\mu$m are formed by plastic deformation, conforming to the shape of the end 12a of the processing stylus 12. Then, as shown in FIG. 6(A), when the substrate 11 is rotated in the direction shown by the arrow and the stylus 12 is displaced in the radial direction of the substrate 11 (the direction shown by the arrow), a spiral recessed track 14 is formed in the surface of the substrate 11. An optical disk 16 is formed by coating an optical recording layer 15 on the surface of the substrate 11 in which this recessed track 14 is formed. (FIG. 6(B))

Figure 7A:
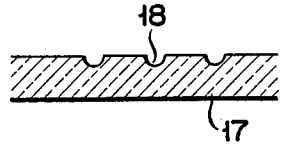
FIGS. 7(A) to 7(E) are sectional views of a method for manufacturing the optical disk according to the second embodiment of the present invention.
Figure 7B:
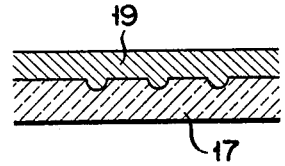
Figure 7C:
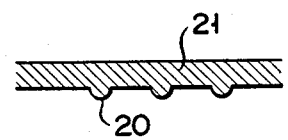
Figure 7D:
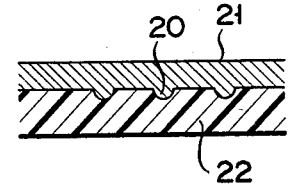
Figure 7E:
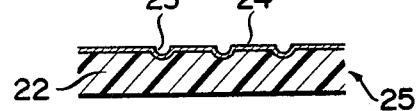

FIGS. 7(A) to 7(E) show the second embodiment of the present invention and illustrates the method for manufacturing the optical disk. Reference numeral 17 in FIG. 7(A) denotes an original disk of a glass material on the surface of which are formed spiral recessed tracks 18 by the processing stylus 12 as in the case of the first embodiment. When a metal layer 19 is coated on the surface of the original disk 17 as shown in FIG. 7(B) and the metal layer 19 is peeled off the original disk 17, a track relief mold 21 is formed having protruding tracks 20 of an inverted pattern with respect to the recessed tracks 18. When this track relief mold 21 is pressed on a disk-shaped substrate 22 of a synthetic resin material as shown in FIG. 7(D), recessed tracks 23 with an inverted pattern of the protruding tracks 20 are formed on the surface of the substrate 22. An optical disk 25 is manufactured by coating an optical recording layer 24 on the surface of the substrate 22, as in the case of the first embodiment.

The original disk 17 may be made of materials other than glass, such as metals like copper and nickel, or plastics.

FIGS. 8(A) to 8(E) show the method for manufacturing an optical disk according to the third embodiment of the present invention.

Figure 8A:
FIGS. 8(A) to 8(E) are sectional views illustrating the method for manufacturing the optical disk according to the third embodiment of the present invention.
Figure 8B:
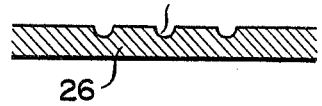
Figure 8C:
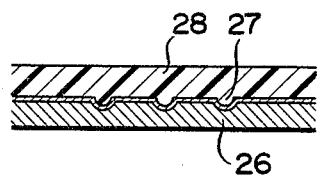
Figure 8D:
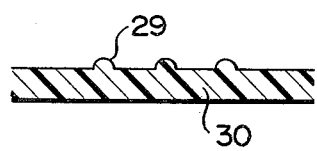
Figure 8E:
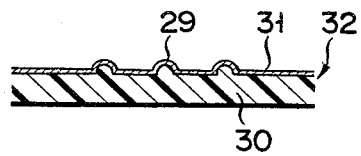

First, in a manner similar to the first and second embodiments and the processes shown in FIGS. 7(A) to 7(C), the spiral recessed tracks 18 are formed by the processing stylus 12 on the surface of the original disk 17 of the same material as used in the second embodiment described above. After coating a metal layer similar to that formed in the second embodiment on the original disk 17, this metal layer is peeled off to provide a second original disk 21' having protruding tracks 20' as shown in FIG. 8(A). After coating a metal layer on this second original disk 21', this metal layer was peeled off to provide a track relief mold 26 having recessed tracks 27 as shown in FIG. 8(B). A synthetic resin layer 28 is cast onto relief mold 26, as shown in FIG. 8(C). When the synthetic resin layer 28 is thereafter peeled off the track relief mold 26, a substrate 30 having protruding tracks 29 in a pattern inverted with respect to the recessed tracks 27 is formed as shown in FIG. 8(D). Then, an optical disk 32 having the protruding tracks 29 may be manufactured by coating an optical recording layer 31 on the surface of the substrate 30 as shown in FIG. 8(E). Once manufactured, the track relief mold 26 may be repeatedly used so that a number of optical disks may be manufactured with a single track relief mold 26.

The optical recording layers 15, 24 and 31 formed in the first to third embodiments of the present invention may be turned into extremely stable optical recording layers by vacuum depositing tellurium films on the substrates 11, 22 and 30 and forcibly oxidizing the surface of these films using ultraviolet rays.

As shown in the first and second embodiments, the width of the recessed tracks 14 and 23 of the optical disks 16 and 25 is about 0.3 $\mu$m. Therefore, this width is sufficiently narrower than the wavelength of the laser beam used in the optical writing and reading system of this type (0.62 $\mu$m with a He-Ne laser, and 0.82 $\mu$m with an AlGaAs diode laser). Furthermore, since the bottoms of the recessed tracks 14 and 23 are spherically curved, the laser beam incident on the recessed tracks 14 and 23 is divergently reflected. That is, the tracks function to reflect the incident laser beam to distribute it more widely than the effective aperture of the lens.

Figure 9:
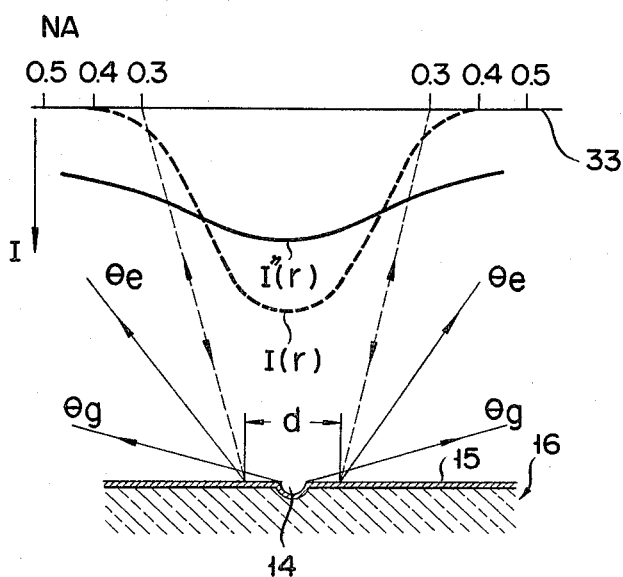
FIG. 9 is a view illustrating the reflecting condition of the laser beam in the first embodiment.

Accordingly, taking the optical disk 16 as an example as shown in FIG. 9, when the optical disk 16 is irradiated with the laser beam L with the spot diameter d, the light incident within the recessed track 14 is divergently reflected up to a maximum angle of $\theta$g by the diffraction of the light upon reflection at the curved surface. The light reflected from the periphery of the recessed track 14 is distributed within the range of $\theta e$. For this reason, the power intensity of light reflected at the surface of lens 33 changes from $I(\gamma)$, when the recessed track 14 is not present, to $I''(\gamma)$, and the amount of reflected light which is incident on the lens 33 having effective aperture of about 0.5 which is generally used is minimized when the center of the spot "d" in diameter of the laser beam is aligned with the central line of the recessed track. When the center of the spot of diameter "d" of the incident laser beam "L" is deviated to the right or left of the central line of the recessed track 14, the amount of reflected light incident on the lens increases and its distribution $I''(\gamma)$ at the surface of the lens 33 becomes assymetrical so that the intensity is weak in the direction opposite to its deviation. In this manner, with the optical disk 16 having the recessed track 14 with a curved surface at the bottom, it is possible to monitor whether the center of the spot of the irradiated laser beam L is on the central line of the recessed track 14 by measuring with a photodetector the amount of reflected light incident on the lens 33 and its power intensity distribution. Thus, tracking control may be performed such that the center of the spot of the laser beam "L" is constantly aligned with the central line of the recessed track 14 of the optical disk 16.

Figure 10:
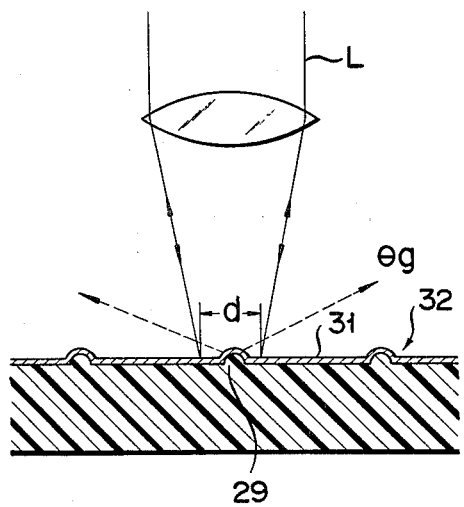
FIG. 10 is a view illustrating the reflecting condition of the laser beam in the third embodiment.

The wavelength of the laser beam L which is generally used is about 0.6 to 0.83 $\mu m$ and the spot diameter "d" is about 1.5 $\mu m$. Therefore, the ratio of the amount of light which is divergently reflected by the recessed track 14 formed in the optical disk 16 is maximized when the center of the spot of the laser beam is aligned with the central line of the recessed track. It is about 8.5% when the width of the recessed track 14 is 0.1 $\mu m$, about 25% when the width is 0.3 $\mu m$, and about 40% when the width is 0.5 $\mu m$. The width of the recessed track 14 formed on the optical disk 16 may be about half the wavelength of the laser beam used, that is, about 0.41 $\mu m$ or less. When the width of the recessed track 14 is wider than this, adverse effects are considerably increased. For example, the amount of the codes of the information to be recorded with the 1.5 $\mu m$ spot diameter is decreased. With the optical disk 32 having the protruding track 29 as in the third embodiment described above, as shown in FIG. 10, the laser beam L with the spot diameter "d" is divergently reflected by the curved surface reflection of the protruding track 29 and the diffraction of light. Since this embodiment has similar effects as the first and second embodiments, the same reference numerals are given and the detailed description will be omitted.

Figure 11:
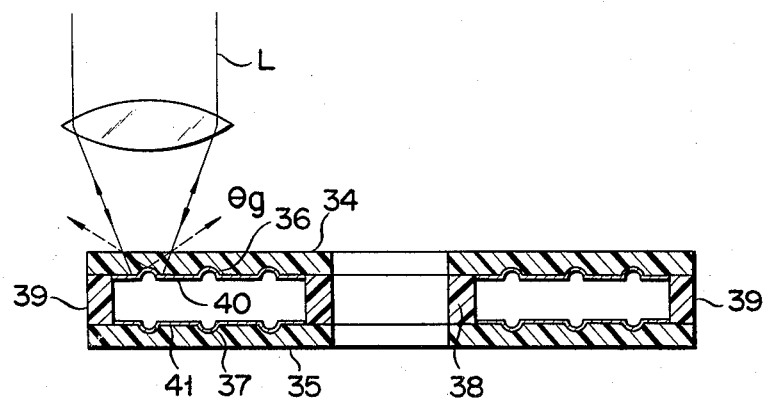
FIG. 11 is a sectional view of the optical disk according to the fourth embodiment.

FIG. 11 shows the fourth embodiment of the present invention. Reference numerals 34 and 35 denote two disk bodies obtained in a manner similar to that in the second embodiment. These disk bodies 34 and 35 are superposed on each other in such a manner that their surfaces have recessed tracks 36 and 37 which face each other, and spacers 38 and 39 about 2 mm in thickness are interposed between the disk bodies at their inner and outer peripheries. With this construction, the laser beam "L" may be irradiated from the rear surfaces of the disk bodies 34 and 35 for writing and reading. Furthermore, with this construction, optical recording layers 40 and 41 may be protected and the amount of information to be recorded may be increased, providing a double-faced optical disk.

The present invention thus provides an optical disk into which information may be written and from which such information may be read, wherein a spiral recessed or protruding track is formed on a substrate and an optical recording layer is coated thereon, so that any deviation of the center of the spot of the laser beam from the center of the protruding or recessed track may be detected. Using this spiral protruding or recessed track as a guideline, tracking control may be easily accomplished while irradiating the laser beam on the optical disk.

In accordance with the present invention, the recessed track, whose dimensions, particularly its depth, need not be precisely regulated, is formed by pressing a processing stylus on the surface of the substrate for plastic deformation; and the protruding track is formed by inverting the pattern of the recessed track. Thus, the optical disk may be manufactured with ease.

In accordance with the present invention, since the recessed or protruding track is formed with a hard processing stylus such as a diamond stylus, a narrow track (less than a half the wavelength of the laser beam) may be formed which has been heretofore impossible with the conventional photoetching method which utilizes the laser beam. Further, the process may be considerably simplified.

Figure 12:
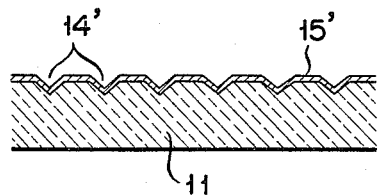
FIG. 12 is a sectional view of the optical disk according to a further embodiment of the present invention.

In the embodiments, the bottom surface or the protruding surface of the recessed or protruding track was curved. However, the present invention is not limited to this particular construction. For example, the bottom surface or the protruding surface of the recessed or protruding track may be V-shaped or inverted V-shaped for obtaining the same effects. This shape may be easily changed by suitably selecting the shape of the pointed end of the processing stylus. FIG. 12 shows the case wherein a V-shaped groove 14' is formed on the surface of the substrate 11 by a processing stylus having a V-shaped front end, and an optical recording layer 15' is coated thereover.

What we claim is:

1. A method for manufacturing an optical recording disk having an optical recording layer in which information is written by irradiating a focussed laser beam modulated by the information, said method comprising the steps of:
    (a) plastically deforming a surface of an original disk to form a spiral recessed track having a width of 0.2 to 0.41 $\mu m$;
    (b) coating a metal layer on the original disk plastically deformed according to step (a);
    (c) separating the metal layer from the original disk to provide a relief mold;
    (d) forming a substrate having a recessed track by using the relief mold formed according to step (c) as a second original disk; and
    (e) coating an optical recording layer on the surface of the substrate.

2. A method for manufacturing an optical recording disk having an optical recording layer in which information is written by irradiating a focussed laser beam modulated by the information, said method comprising the steps of:
    (a) plastically deforming a surface of an original disk to form a spiral recessed track having a width of 0.2 to 0.41 $\mu m$;
    (b) coating a metal layer on the original disk plastically deformed according to step (a);
    (c) separating the metal layer from the original disk to provide a second original disk;
    (d) coating a metal layer on the second original disk to provide a relief mold;

(e) casting a synthetic resin layer on the relief mold;

(f) forming a substrate having a protruding track by separating the synthetic resin layer and the relief mold and thus inverting the pattern of the recessed track; and (g) coating an optical recording layer on the surface on the substrate.

* * * * *